A. RIGBY.
CULTIVATOR.
No. 177,007.  Patented May 2, 1876.
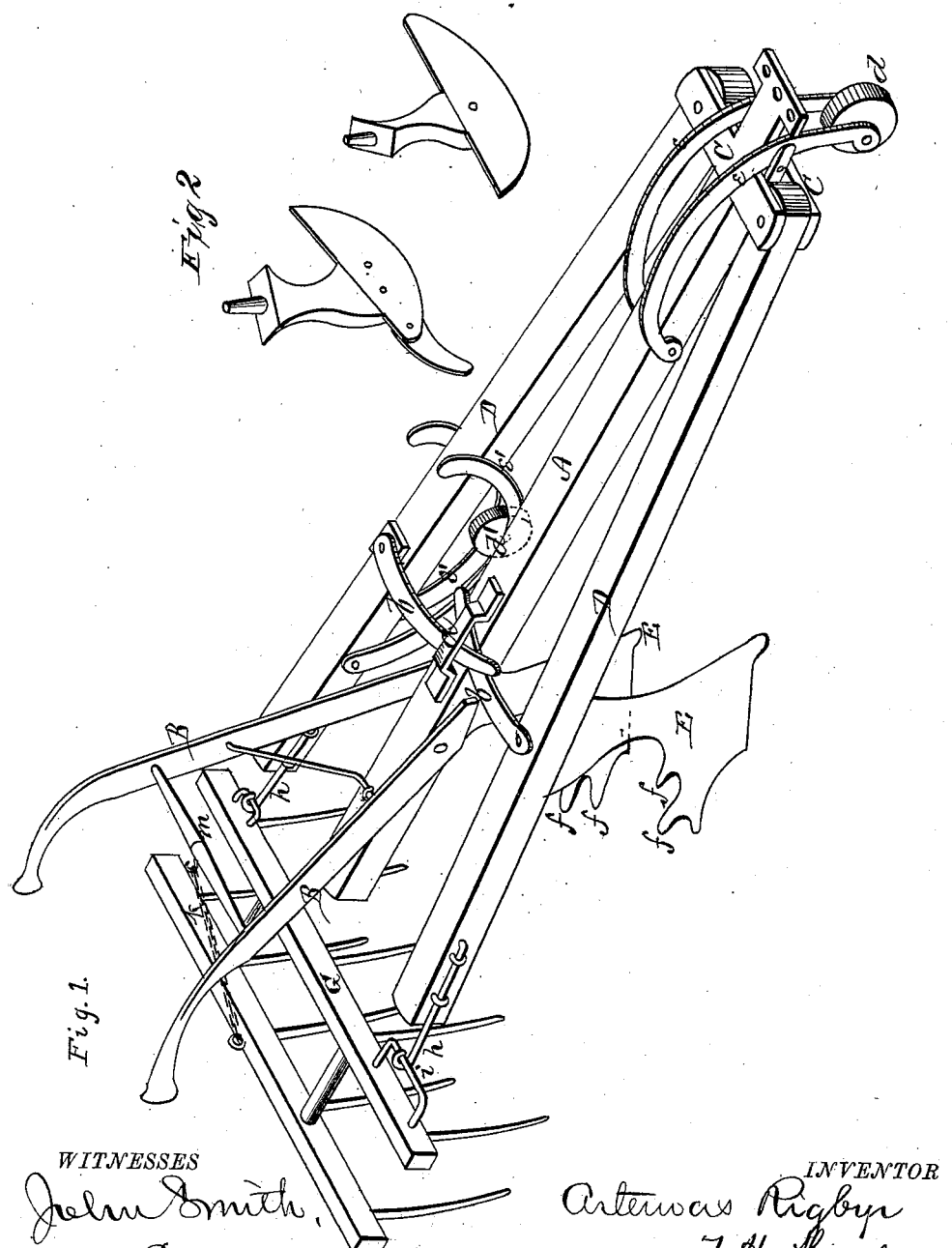

UNITED STATES PATENT OFFICE.

ARTEMAS RIGBY, OF UPPER STILLWATER, MAINE.

IMPROVEMENT IN CULTIVATORS.

Specification forming part of Letters Patent No. 177,007, dated May 2, 1876; application filed March 11, 1876.

*To all whom it may concern:*

Be it known that I, ARTEMAS RIGBY, of Upper Stillwater, in the county of Penobscot and State of Maine, have invented certain new and useful Improvements in Gang-Plow and Pulverizer; and I do hereby declare that the following is a full, clear, and exact description thereof, reference being had to the accompanying drawings, and to the letters of reference marked thereon, which form part of this specification.

The nature of my invention consists in the construction and arrangement of a gang-plow or pulverizer, as will be hereinafter more fully set forth.

In the annexed drawing, Figure 1 is a perspective view of my invention. Fig. 2 show furrowing-wings used with the frame of the gang-plow.

A represents the center beam to which the handles B B are attached. On the front end of the beam A are secured top and bottom plates C C, the upper one of which forms a clevis, as shown. Between the ends of the plates C C, on each side of the center beam, is pivoted a side beam, D, which is held at any suitable distance from the center beam by an arm, $b$, pivoted on the side beam and passing through a loop, $a$, on top of the center beam, and by which means the side beams can be adjusted out and in, as desired. Under the front end of the machine is a gage-wheel, $d$, arranged in an adjustable curved frame, $e$, and under the left-side beam is another similar wheel, $d'$, also mounted in a curved adjustable frame, $e'$. To the under side of each beam A and D is secured a plow, E, constructed as shown, with points $f$ projecting from the upper edge of the mold-board. From the rear ends of the side beams D D project rods $h$, to the ends of which is hinged a harrow, G. One of these rods connects with the harrow by a staple, $i$, to admit of the lateral adjustment of the side beams. The harrow is, by a chain, $k$, connected with a hook on the round $m$ connecting the two handles B B, by which means the harrow may be raised and lowered, as desired.

This machine will thoroughly pulverize the ground without turning the ground entirely upside down, and is particularly adapted to spring use. The rich loam is not turned down deep, but left upon the surface.

For furrowing, the harrow and plows are removed, and furrow-wings H H are attached at the rear ends of the beams.

Having thus fully described my invention, what I claim as new, and desire to secure by Letters Patent, is—

The combination, with the adjustable side beams of a gang-plow, of the hooked rods $h$ $h$, harrow G, with elongated staple $i$, chain $k$, and round $m$, with its hook, substantially as and for the purposes herein set forth.

In testimony that I claim the foregoing as my own, I affix my signature in presence of two witnesses.

ARTEMAS RIGBY.

Witnesses:
 FRANK HAMBLEN,
 C. L. EVERT.